(12) United States Patent
Wang et al.

(10) Patent No.: US 7,880,888 B2
(45) Date of Patent: Feb. 1, 2011

(54) PHOTOELECTRIC SENSOR FOR SENSING A TARGET

(75) Inventors: Jianhua Wang, Shanghai (CN);
Jianyong Liao, Shanghai (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 129 days.

(21) Appl. No.: 12/405,528

(22) Filed: Mar. 17, 2009

(65) Prior Publication Data

US 2010/0238448 A1 Sep. 23, 2010

(51) Int. Cl.
*G01N 21/55* (2006.01)
(52) U.S. Cl. .................... 356/445; 250/201.1
(58) Field of Classification Search ............... 356/445; 250/201.1, 201.2
See application file for complete search history.

(56) References Cited

U.S. PATENT DOCUMENTS

| | | | | |
|---|---|---|---|---|
| 3,584,223 A | * | 6/1971 | Aldrich et al. | 250/216 |
| 2002/0008191 A1 | * | 1/2002 | Faska et al. | 250/208.1 |
| 2002/0084432 A1 | * | 7/2002 | Sugiyama et al. | 250/559.38 |

OTHER PUBLICATIONS

Banner, S18 Sensors—dc-Voltage Series; www.bannerengineering.com; Jan. 2005; 7 pages.
Allen Bradley, PHOTOSWITCH Photoelectric Sensors; 42CA, General Purpose 18mm Cylindrical Style, Jun. 2004; pp. R1-45-47 (3 pages).
DATASENSOR, Universal Tubular Sensors, M18 Multifunction Optoelectronic Sensors; S50 Series; Jan. 2005; 48 pages.
OMRON, Photoelectric Sensors E3F2; Apr. 2005; 24 pages.

* cited by examiner

*Primary Examiner*—Roy Punnoose
(74) *Attorney, Agent, or Firm*—Whyte Hirschboeck Dudek; William R. Walbrun; John M. Miller

(57) ABSTRACT

Disclosed herein is an exemplary photoelectric sensor having an emitting portion for emitting light toward a target and a receiving portion for receiving, through a receive lens, reflected light that is at least some of the emitted light that is reflected by the target. The sensor further includes a refraction block having a block first surface and a block second surface wherein the reflected light received from the receive lens is refracted by at least one of the block first surface and the block second surface as it passes through the refraction block. The sensor also includes a photodetector for receiving the reflected light refracted by the refraction block and provides a detection signal indicative of the reflected light received.

20 Claims, 10 Drawing Sheets

| CA DIFFUSE 100mm MARGIN CURVE (WHITE PAPER) | | | | | | | | | | |
|---|---|---|---|---|---|---|---|---|---|---|
| DISTANCE(mm) | 134 | 122 | 115 | 104 | 100 | 79 | 74 | 60 | 50 | 33 | 23 | 12 | 5 | 3 | 1 |
| WHITE PAPER | 1 | 2 | 4 | 8 | 16 | 32 | 64 | 128 | 256 | 512 | 610 | 256 | 128 | 80 | 50 |

| CA DIFFUSE 100mm MARGIN CURVE (18% REFLECTIVITY PAPER) | | | | | | | | | | |
|---|---|---|---|---|---|---|---|---|---|---|
| DISTANCE(mm) | 108 | 104 | 100 | 80 | 75 | 62 | 51 | 34 | 25 | 12 | 5 | 3 | 1 |
| 18% REFLECTIVITY PAPER | 1 | 2 | 3 | 6 | 12 | 24 | 48 | 100 | 120 | 50 | 24 | 15 | 4 |

PHOTOELECTRIC SENSOR FOR SENSING A TARGET

CROSS-REFERENCE TO RELATED APPLICATIONS

Not Applicable

STATEMENT REGARDING FEDERALLY SPONSORED RESEARCH OR DEVELOPMENT

Not Applicable

FIELD OF THE INVENTION

The present invention relates to the field of photoelectric sensors.

BACKGROUND OF THE INVENTION

Photoelectric sensors use light to sense targets without physical contact and are used in a wide variety of applications and environments, such as to sequentially detect the presence or absence of targets on a conveyor belt, or to detect a change in the size, shape, reflectivity, or color of a target. Various types of photoelectric sensors are available, such as transmitted beam sensors, retro-reflective sensors, and diffuse sensors. Each of these sensors includes a light source, such as a light emitting diode (LED) or a laser, and a photodetector for detecting light, such as a photodiode or phototransistor, and can also include one or more lenses to focus or narrow the beam of light emitted by the light source and/or to focus or narrow the received light for efficient detection by the photodetector. These sensors typically also include circuitry in communication with the photodetector for producing a voltage or current signal indicative of a characteristic of the sensed target, such as high and low voltage or current states for respectively indicating the presence and the absence of the target at a specified location.

A transmitted beam photoelectric sensor is arranged such that the light source is located on one side of a path of a target to be sensed, and the photodetector is located on the other side of the path. A light beam from the light source is directed to the photodetector, and when the target blocks this light beam from being received by the photodetector, a resulting change in the amount of detected light gives rise to an output signal indicative of the presence of the target. As for the retro-reflective and diffuse type sensors, both of these sensor types combine the light source and the photodetector in a single housing. A retro-reflective sensor uses a reflector situated on the opposite side of a path of a target to be sensed, and the reflector reflects a light beam from the light source back to the photodetector, with the presence of the target blocking this light beam. A diffuse sensor operates by using the target itself to reflect the light beam from the light source back to the photodetector such that, for example, more light is received and detected when the target is present compared to when it is absent. Diffuse sensors are well suited for applications with space requirements that limit the positioning of a reflector across from the photodetector.

Successful sensing requires that a change in the position, size, shape, color, or reflectivity of the target causes a sufficient measurable change in the amount of light detected by the photodetector. The performance of a photoelectric sensor can be quantified using the concept of margin or excess gain. Margin is a measurement of the amount of light from the light source that is detected by the photodetector compared to a minimum light level required to switch the output signal of the sensor (such as from a level indicative of the absence of a target to a level indicative of the presence of a target). A margin of zero occurs when none of the light emitted by the light source can be detected by the photodetector. A margin of one occurs when just enough light is detected to cause the output signal of the sensor to change states, for example, to switch from a low level indicative of the absence of a target to a high level indicative of the presence of the target. A margin of twenty (commonly expressed as 20×) occurs when twenty times the minimum light level required to switch the output signal of the sensor is detected by the photodetector. In other words, the higher the margin, the more capable a photoelectric sensor is at sensing a target at that distance.

Margin is measured and expressed relative to the reflectivity of the reflecting surface, for example relative to a white paper having a reflecting surface rated at 90% reflective, which will reflect more light and therefore allow for a larger margin than a paper surface that is 18% reflective. A margin value corresponds to a specific distance between a target to be sensed and the front of the receiving lens of the sensor, and typical response curves are often provided for a photoelectric sensor, which show what the typical margin will be depending on the sensing distance. A sensing distance for a diffuse type sensor is defined as the distance from the front of the receiving lens of a sensor to the specified target.

Photoelectric sensors are often characterized in terms of their maximum and minimum sensing distances. Often a "blind area" exists in which a target that is too close to the sensor can not be sensed because the light reflected from the target is not received by the photodetector. This occurs in the case of a diffuse sensor because the light source and the photodetector are combined within the same housing such that the emitted light and the light reflected from the target to be detected and received by the sensor each travel along different paths, and the reflected light enters the sensor at an angle with respect to the emitted light. The closer a target is to the sensor, the greater is the angle of the reflected light. At some point, the angle between the paths becomes so great that no light can be received by the photodetector.

In the case of target detection, in order to obtain a sufficient measurable change in the amount of received light by the photodetector from the target reflecting light emitted by the light source (or blocking it), it may be necessary to increase the intensity of the emitted light, to increase the sensitivity of the photodetector, and/or to increase the diameter of a receiver lens situated in front of the photodetector. These modifications allow more light to be detected by the photodetector and result in an increased margin.

The drawback to these modifications is that background (non-target) targets are more likely to reflect light back to the photodetector, resulting in inaccurate measurements corresponding to the target to be sensed. In addition, increasing the size of the receiver lens will effectively increase the target minimum sensing distance, thereby limiting the photoelectric sensor's ability to sense targets situated close to the photoelectric sensor. Specifically, for targets that are situated very close to a diffuse type photoelectric sensor, the reflected light received is at such a wide angle with respect to the emitted light that it is not received or sensed by the photodetector. Further, the size of the receive lens is limited by the size of the photoelectric sensor itself.

BRIEF SUMMARY OF THE INVENTION

The present inventor has recognized the aforementioned disadvantages associated with conventional photoelectric sensors, and has further recognized that an improved photoelectric sensor can overcome one or more of these disadvantages by using a refraction block to refract reflected light from a target to a photodetector surface. In at least one embodiment, such an improved photoelectric sensor can operate by employing an emitting portion for emitting light to a target and a receiving portion for receiving, through a receive lens, reflected light that is at least some of the emitted light that is reflected by a target, and a refraction block having a block first surface and a block second surface, wherein the reflected light received from the receive lens is refracted by at least one of the block surfaces as it passes through the refraction block. The sensor also includes a photodetector for receiving the reflected light refracted by the refraction block and provides a detection signal indicative of the reflected light received by the photodetector.

In at least some embodiments, the present invention relates to a method for sensing a target that includes emitting light towards a target from a light source situated in an emitting portion, and receiving through a receive lens reflected light that is at least some of the emitted light that is reflected by the target. The method further includes receiving the reflected light from the receive lens at a refraction block that includes a block first surface and a block second surface, and refracting the reflected light using at least one of the block surfaces. The method additionally includes receiving the reflected light from the block second surface at a photodetector surface, and generating a signal indicative of the reflected light received at the photodetector surface.

Other embodiments, aspects, features, objectives, and advantages of the present invention will be understood and appreciated upon a full reading of the detailed description and the claims that follow.

BRIEF DESCRIPTION OF THE DRAWINGS

Embodiments of the invention are disclosed with reference to the accompanying drawings and are for illustrative purposes only. The invention is not limited in its application to the details of construction or the arrangement of the components illustrated in the drawings. The invention is capable of other embodiments or of being practiced or carried out in various other ways. Like reference numerals are used to indicate like components. In the drawings.

DETAILED DESCRIPTION OF THE PREFERRED EMBODIMENT

The following description is in the context of an exemplary diffuse type photoelectric sensor for sensing the presence of targets, although other types of sensors for sensing various other characteristics of targets are also contemplated as being within the scope of the invention.

Figure 1B:
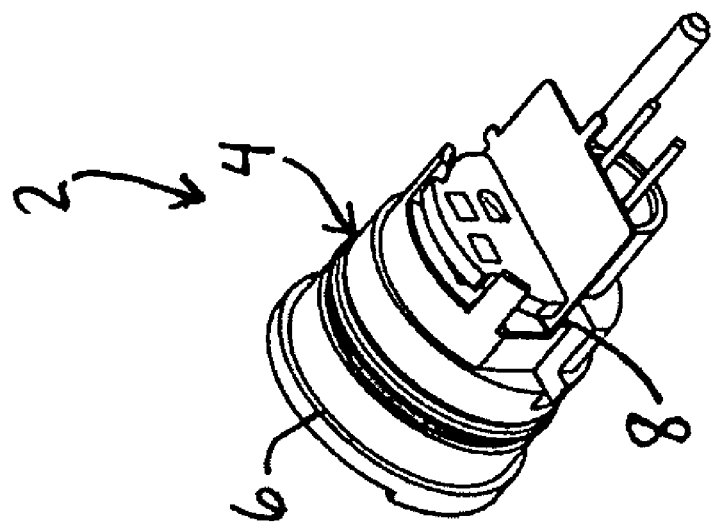
FIG. 1B is a rear perspective view of the photoelectric sensor of FIG. 1A.
Figure 1A:
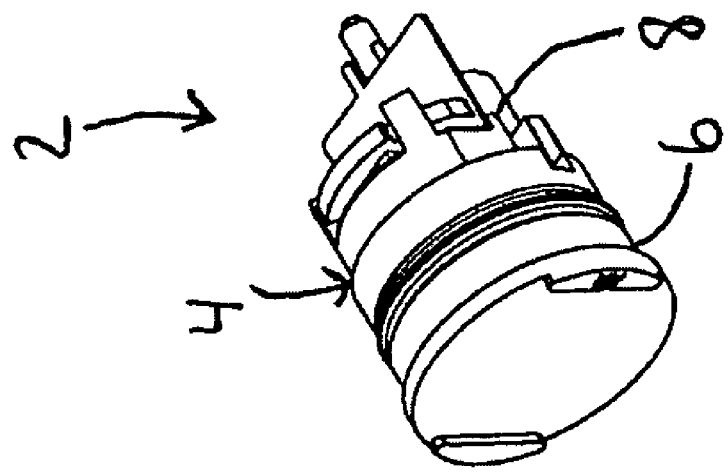
FIG. 1A is a front perspective view of an exemplary photoelectric sensor.
Figure 2:
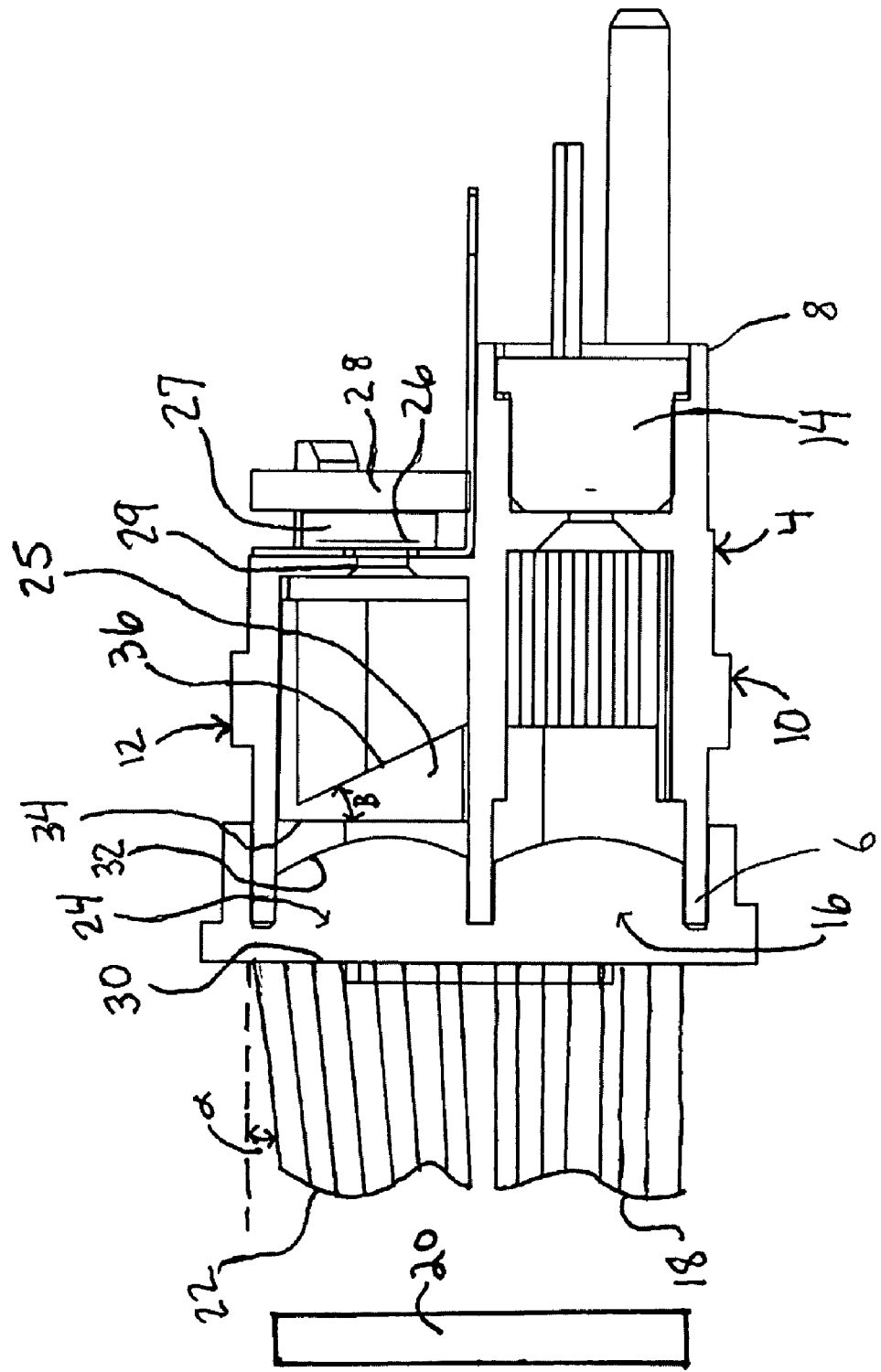
FIG. 2 is a cross-sectional side view of the photoelectric sensor of FIG. 1A.

FIGS. 1A and 1B respectively show front and rear perspective views of the exemplary photoelectric sensor 2. FIG. 2 shows a cross-sectional view of the sensor 2 of FIG. 1A operating in relation to an exemplary target 20, which can be any object or structure, the presence or absence of which is of interest. For simplicity of illustration, a portion of the space between the sensor 2 and the target 20 is cutaway, and only portions of the light communicated within the sensor 2 and between the sensor 2 and the target 20 are shown.

As a general overview, the photoelectric sensor 2 is configured to emit light toward a predetermined location. When a target 20 is present at the predetermined location, emitted light directed toward the target is reflected, and reflected light that is at least a portion of the emitted light is received by the sensor 2. The sensor 2 includes a refraction block 25 to refract the received reflected light to be measured by a photodetector 27, allowing the sensor 2 to sense both near and far targets with a high margin.

Figure 1C:
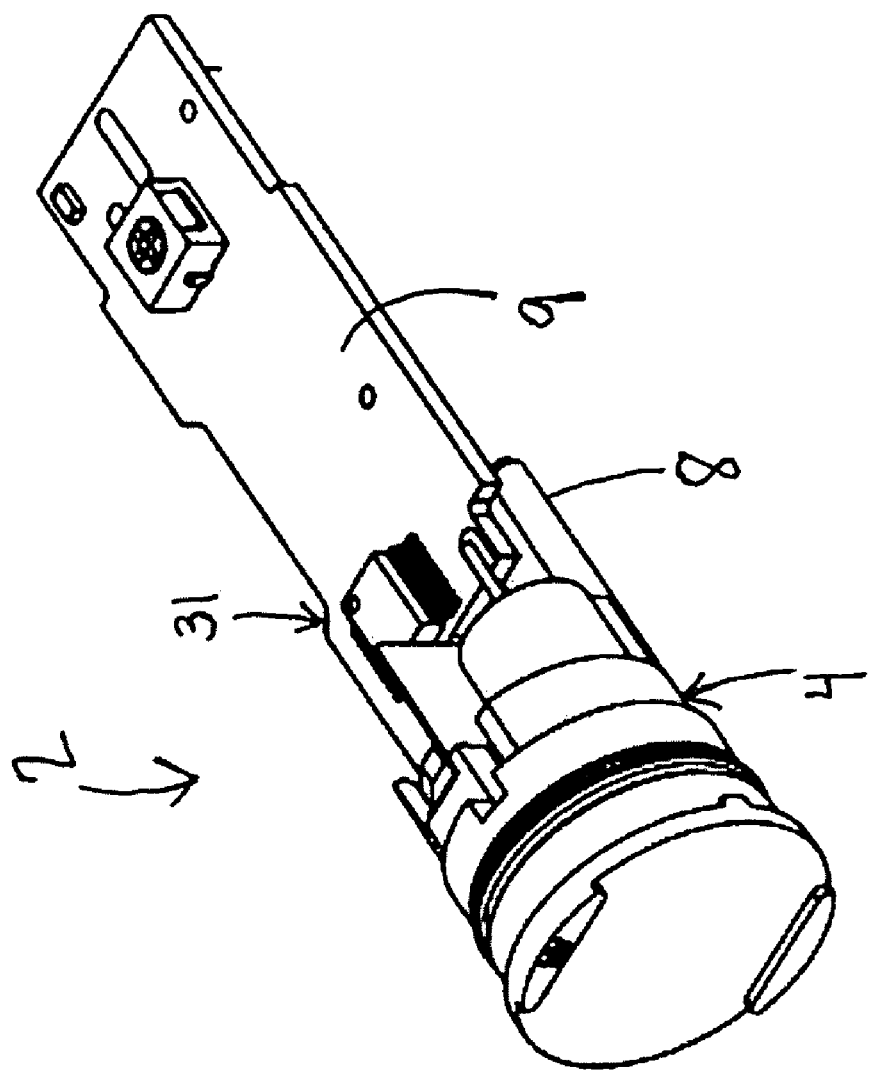
FIG. 1C is a front perspective view of the photoelectric sensor of FIG. 1A when also including a parent circuit board.

Referring to FIGS. 1A-1C, the sensor 2 includes a housing 4 having a front end 6 and a back end 8. The housing 4 can be formed as a molded plastic composite, as a single piece or as multiple pieces. Further, FIG. 1C depicts the sensor 2 of FIG. 1A which further includes a parent circuit board 9 situated at the back end 8 of the housing 4 for supporting components forming a circuit with the photodetector 27, which circuit generates a signal indicative of the presence of the target 20.

Figure 1E:
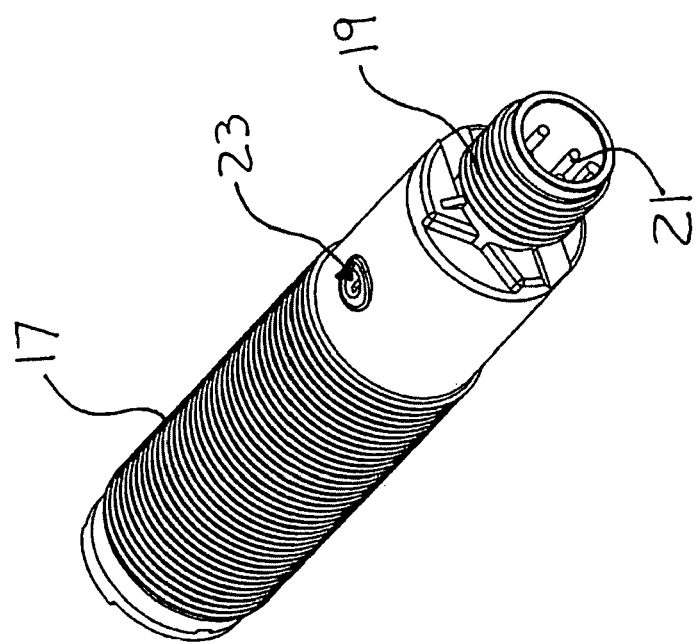
FIG. 1E is a back perspective view of the photoelectric sensor of FIG. 1D.
Figure 1D:
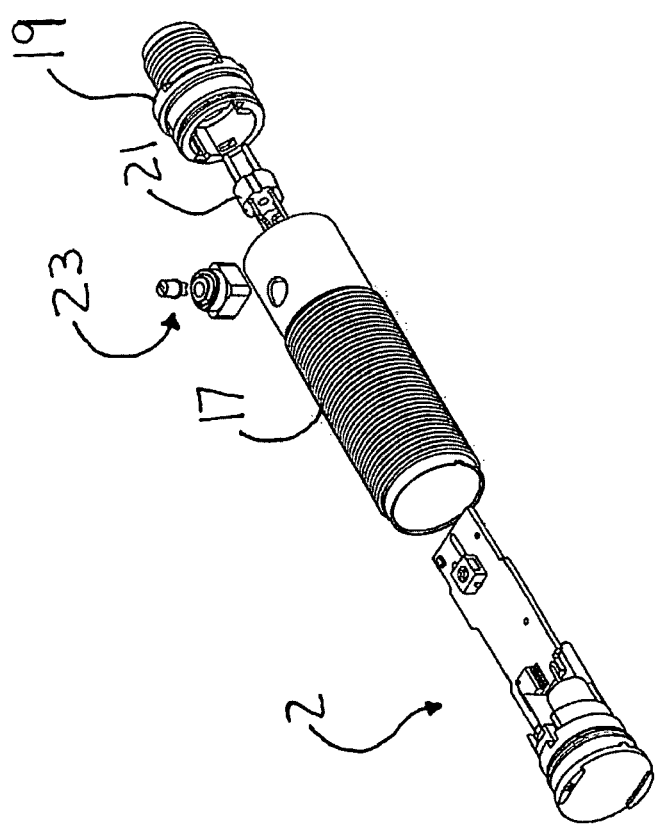
FIG. 1D is an exploded front perspective view of the photoelectric sensor of FIG. 1A depicting various additional components.

With respect to FIGS. 1D and 1E, although not shown in FIGS. 1A-1C, the sensor 2 also includes other components such as, a casing 17, an end plug 19, a connector 21, and a remote adjuster 23. These components are not necessary for the description of the operation of the sensor 2, and for the sake of simplicity, are not shown or described further.

Referring to FIG. 2, the sensor 2 includes an emitting portion 10 and a receiving portion 12 arranged adjacent to one another. The emitting portion 10 includes a light source 14 for emitting light, such as a light emitting diode (LED) or a laser. The light source 14 is situated adjacent the back end 8 of the housing 4. The emitting portion 10 can also include an emit lens 16 situated adjacent the housing front end 6. The emit lens 16 refracts the light emitted from the light source 14 resulting in emitted light 18 being directed towards the target 20. The target 20 reflects at least a portion of the emitted light 18 back towards the sensor 2 as reflected light 22, where it is received by the receiving portion 12 of the sensor 2.

Further as shown, the receiving portion 12 includes a receive lens 24 and a refraction block 25, which direct the reflected light 22 towards a surface 26 of the photodetector 27. In addition, a housing aperture 29 is formed in the housing and is situated in between the refraction block 25 and the photodetector surface 26. The housing aperture 29 provides a controlled entry point for the reflected light 22 that is directed to the photodetector surface 26. The housing aperture 29 can vary in size to accommodate particular applications. The photodetector 27 additionally is mounted to a daughter printed circuit board 28 and the daughter printed circuit board 28 is mounted to the parent circuit board 9 as shown in FIG. 1C to form a photodetector circuit 31. The photodetector circuit 31 is configured to provide a signal indicative of a sensed characteristic of the target 20. For example, the presence of the target 20 can be indicated by high or low current or voltage if more than a predetermined amount of light is received by the photodetector 27.

Still referring to FIG. 2, the receive lens 24 has a front surface 30 and a rear surface 32. The front and rear surfaces 30, 32 refract and focus the reflected light 22 as it enters and passes through the receive lens 24. In at least some embodiments, the front surface 30 is planar and therefore, when reflected light 22 contacts the front surface 30 at a non-perpendicular angle, the front surface 30 refracts the reflected light 22. Although in other embodiments, the front surface 30 can be non-planar, such as convex. The reflected light 22 is directed from the front surface 30 to the rear surface 32. In at least some embodiments, the rear surface 32 is convex, thereby focusing the reflected light 22 as it passes through the rear surface 32 towards the photodetector surface 26.

Figure 3B:
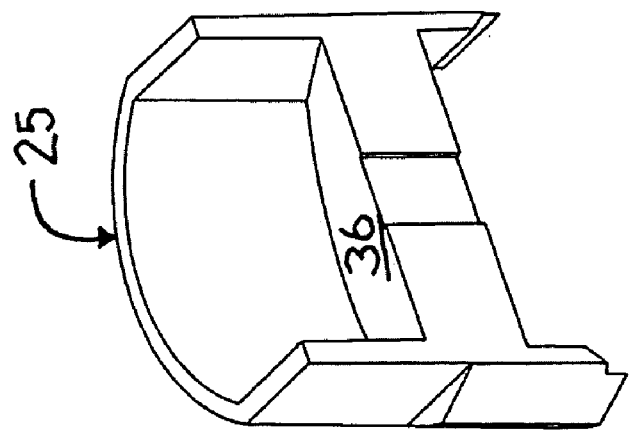
FIG. 3B is a rear perspective view of the refraction block shown in FIG. 2.
Figure 3A:
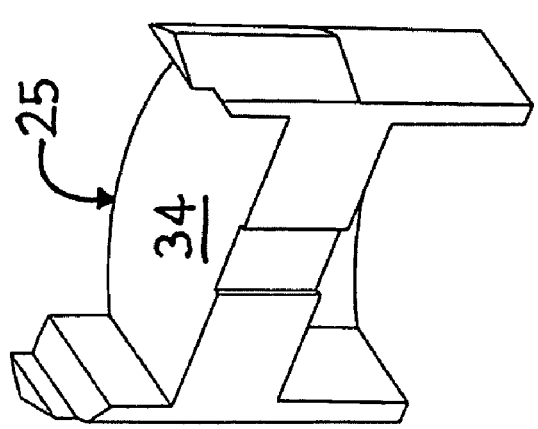
FIG. 3A is a front perspective view of a refraction block shown in FIG. 2.

The refraction block 25 is positioned in the receiving portion 12, between the receive lens 24 and the photodetector surface 26, as shown in FIG. 2. The refraction block 25 includes a block first surface 34 and a block second surface 36 (see also FIGS. 3A and 3B), wherein each surface 34, 36 can refract the reflected light 22. The block first surface 34 is positioned to receive the reflected light 22 emanating from the rear surface 32 of the receive lens 24. In at least one embodiment, the block first surface 34 and the front surface 30 are both substantially planar and parallel to the photodetector surface 26. The block second surface 36 is situated at an angle β with respect to the block first surface 34. The refraction block 25 can be formed of a refracting material for transmitting and refracting light, such as an optical acrylic material or polycarbonate material.

Still referring to FIG. 2, reflected light 22 enters the front surface 30 of the receive lens 24 at an angle of incidence α. Because the emitting portion 10 and receiving portion 12 are not coaxial, and assuming that, as shown, the emitted light 18 incident upon the target 20 is emitted perpendicularly from the emitting portion 10, the reflected light 22 will have an angle α that is greater than zero. Without the refraction block 25, the receive lens 24 alone determines the sensor's ability to direct the reflected light 22 to the photodetector surface 26. Because the receive lens 24 has only one surface for refraction and one surface for focusing the reflected light 22, the sensor 2 would have a very limited ability to sense reflected light 22 that is received at an angle α that is large, which occurs when a target 20 is within close proximity to the sensor 2. In this case, the reflected light 22 reflecting off a close target 20 would not be directed to the photodetector surface 26, and therefore would not be detected. Further, if the angle α is large, such that only a minimal amount of reflected light 22 (or no reflected light) is able to reach the photodetector surface 26, the margin value of the sensor 2 will be undesirably low at that specific target distance. If the sensor's sensitivity is fixed, the margin curve value of a sensor is largely dependent on the intensity of the light received, less light at the photodetector surface translates into a lower margin value.

Figure 4B:
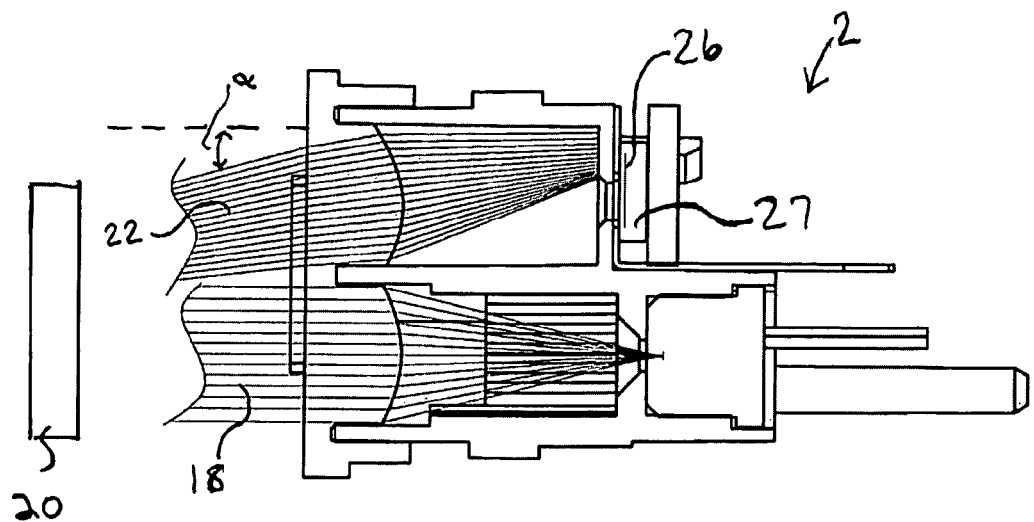
FIG. 4B is a cross-sectional side view of the photoelectric sensor of FIG. 1A modified so as not to include a refraction block and depicting a light response to a short-range target.
Figure 4A:
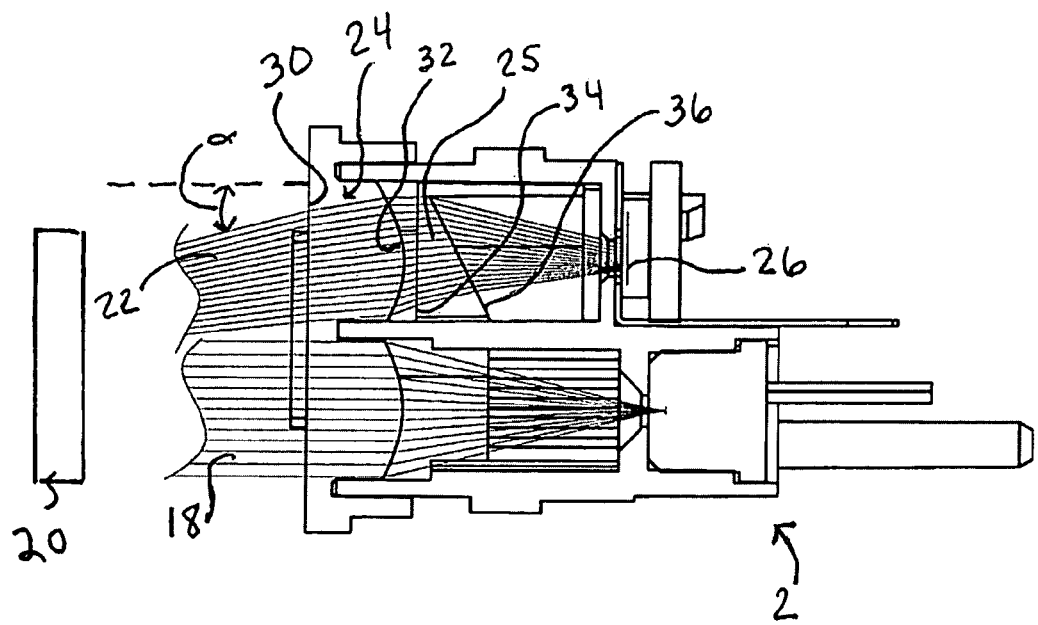
FIG. 4A is a cross-sectional side view of the photoelectric sensor of FIG. 1A, and depicting a light response to a short-range target.

Turning to FIG. 4A, operation of the refraction block 24 in directing the reflected light 22 within the sensor is shown in more detail. In particular, with a target 20 at a close target distance of about 30 millimeters (mm), which results in a large angle α, the reflected light 22 is refracted at the front surface 30 of the receive lens 24 and is received at the rear surface 32. The reflected light 22 is then focused by the rear surface 32 and progresses to the block first surface 34. The block first surface 34 substantially refracts the light 22 towards the block second surface 36, which is further refracted by the block second surface 36 and directed towards the photodetector surface 26. Thus, the light 22 received at the receive lens 24 is redirected towards the photodetector surface 26 by the refraction block 25.

The presence of the refraction block 25 dramatically changes the performance of the sensor 2 from what it would otherwise be without the refraction block. FIG. 4B in particular depicts the sensor 2 without the refraction block 25, again with a target 20 at a distance of 30 mm from the sensor 2. As discussed above, when the target 20 is too close to the sensor 2, the angle α becomes large, and less of the reflected light 22 reaches photodetector surface 26. Thus, the presence of the refraction block 25 allows the sensor 2 to detect the target 20 when otherwise it might not be detectable.

Figure 4D:
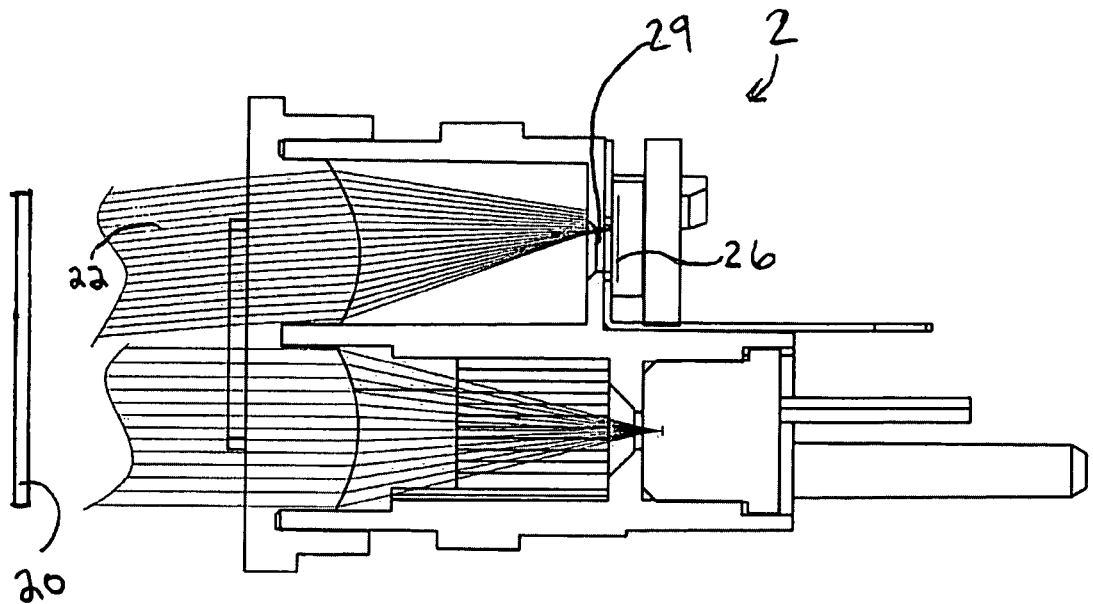
FIG. 4D is a cross-sectional side view of the sensor of FIG. 4C modified so as not to include a refraction block and depicting a light response to a long-range target.
Figure 4C:
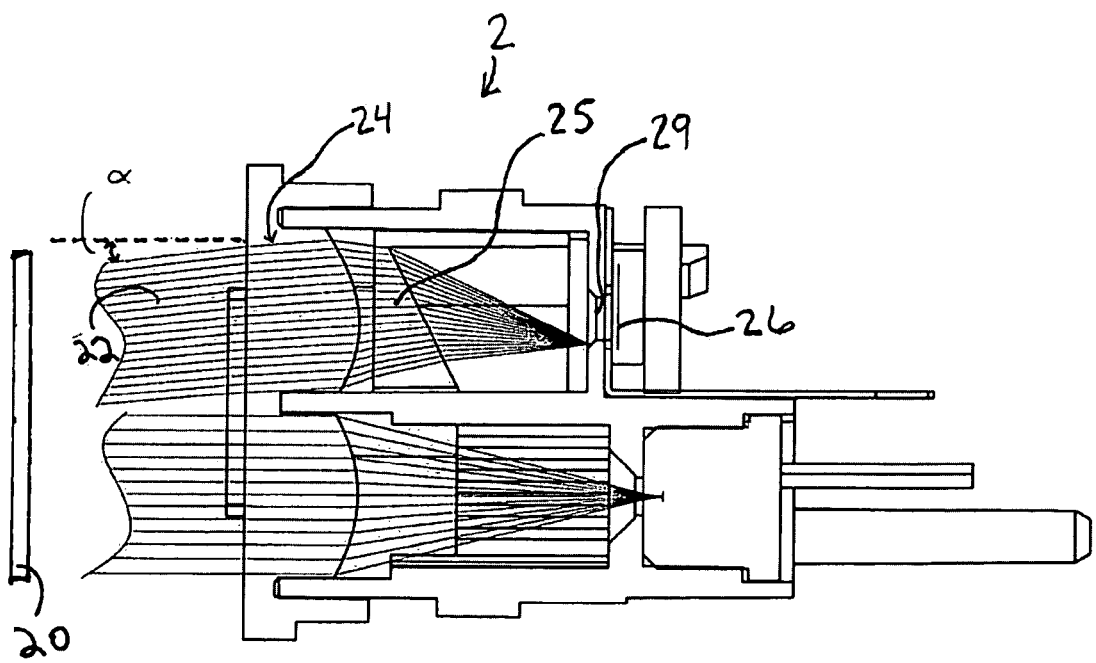
FIG. 4C is a cross-sectional side view of the photoelectric sensor of FIG. 2 depicting a light response to a long-range target.

Turning to FIG. 4C, the presence of the refraction block 25 impedes performance of the sensor 2 in detecting a target that is relatively far away. In particular, FIG. 4C shows the reflected light 22 from the target 20 when it is 130 mm away from the sensor 2 being received by the receive lens 24. The greater the distance between the receive lens 24 and the target 20, the smaller the angle α becomes. Generally, as the angle α becomes smaller, less of the reflected light 22 is directed to the photodetector surface 26 by the receive lens 24 and the refraction block 25.

Although the refraction block 25 directs the reflected light 22 to the photodetector surface 26 for a wide range of angle α values, when the angle α becomes too small, a point is reached where the light 22 does not pass through the housing aperture 29 and therefore is prevented from reaching the photodetector surface 26. In this regard, the housing aperture 29 can serve as a pre-defined cut-off for a desired target distance. By preventing the light 22 from reaching the photodetector surface 26 at a particular distance, the photodetector sensitivity can be increased to obtain a higher margin value.

In contrast, in FIG. 4D, when the refraction block 25 is not included, only a small portion of the reflected light 22 is received at the photodetector surface 26. As the portion of reflected light 22 is small, the margin value is also small. If the portion of light received becomes too small, the photodetector 26 may not receive enough light to detect the target, thereby creating a blind spot. Further, the sensitivity of the sensor 2 cannot be increased to eliminate the blind spot as this would increase the maximum target sensing range, which is undesirable.

Although a target sensing range of 30 mm to 130 mm has been discussed and depicted in FIGS. 4A and 4C, other ranges of sensing distances can also be accommodated. Depending on the specific application, and the target distance and position relative to the sensor, the refraction block 25 can be configured to compensate for various angles of the reflected light 22 entering the receive lens 24. Further, the refraction block 25 can be positioned at various points along the length of the receive portion 12 (e.g., at different locations between the receive lens 24 and the photodetector surface 26) to further accommodate a specific target distance. Additionally, the angle β (as seen in FIG. 2) can be varied depending on the target position, the intensity of the light source, and the sensitivity setting of the photodetector circuit 31. For example, in one embodiment, for sensing a target no greater than about 135 mm from the receive lens 24, the angle β is about 30 degrees to about 35 degrees. In another embodiment, the angle β can be between about 5 degrees to about 85 degrees.

Figure 5B:
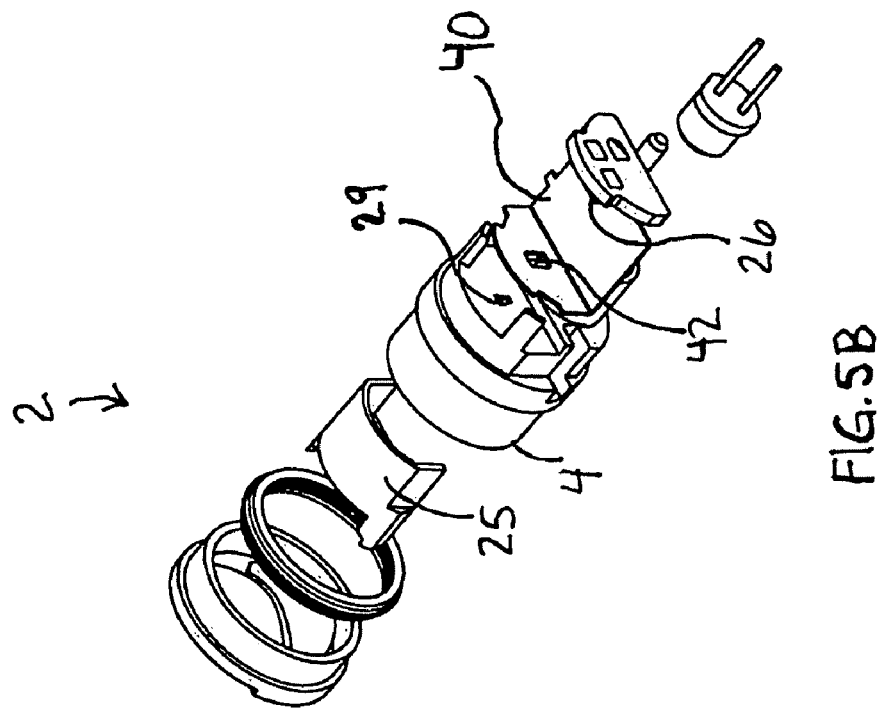
FIG. 5B is an exploded back perspective view of the photoelectric sensor of FIG. 1A.
Figure 5A:
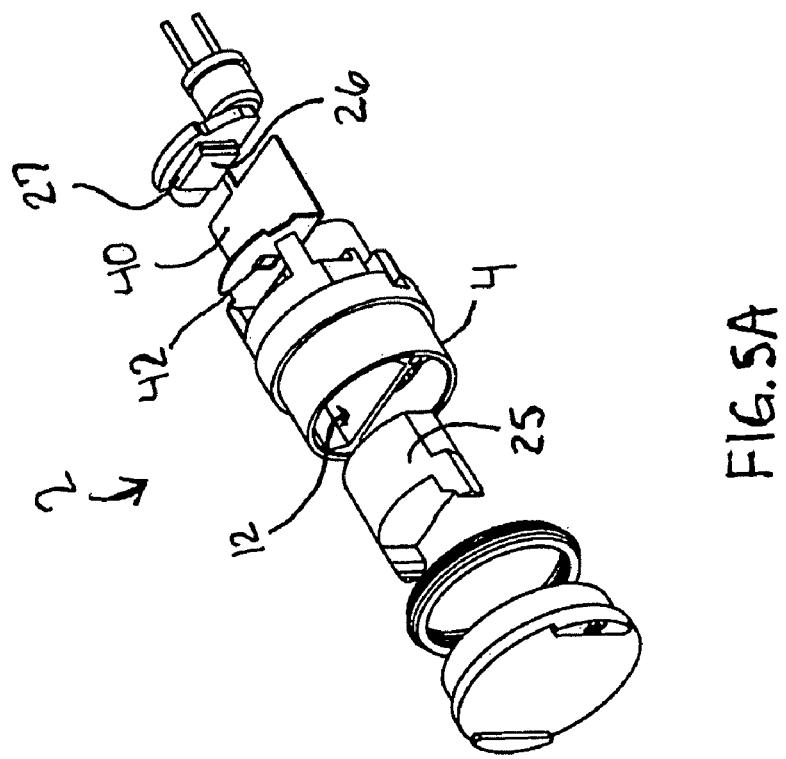
FIG. 5A is an exploded front perspective view of the photoelectric sensor of FIG. 1A.

Referring to FIGS. 5A and 5B, an exploded perspective view of the sensor 2 is depicted. The refraction block 25 is shown as a discrete piece that is insertable into the housing 4. The discrete refraction block 25 can be shaped to accommodate various existing sensor housings and can therefore provide the associated benefits without requiring re-tooling of an existing housing. In some other embodiments, the refraction block 25 can be at least partially integral with housing 4.

Further referring to FIGS. 5A and 5B, in at least some embodiments an electromagnetic interference (EMI) shield 40 is provided. As the photodetector 27 is susceptible to EMI, the EMI shield 40 is provided to at least partially block EMI from disrupting the photodetector 27. The shield 40 can be comprised of a metal, such as copper, or it can be another material that is at least partially impervious to EMI. The shield 40 is positioned substantially between the photodetector 27 and the housing 4. The shield 40 includes a shield aperture 42 that substantially aligns with the housing aperture 29 to allow light 22 to pass through the housing aperture 29 to the photodetector surface 26.

Figures 6A, 6B:
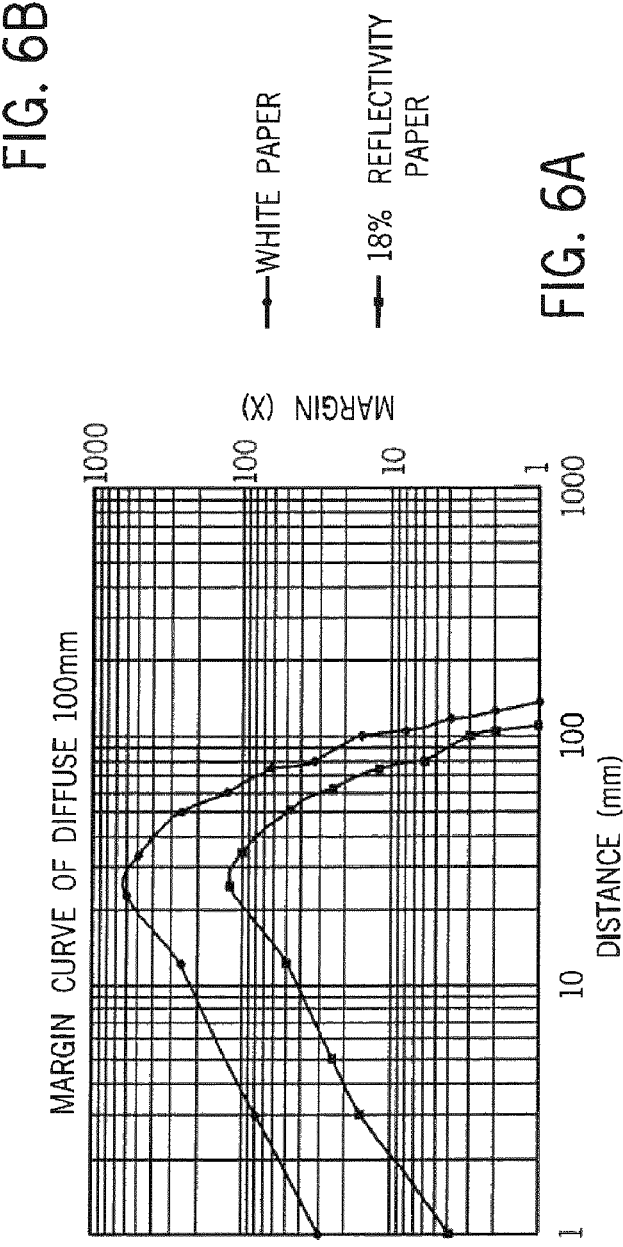
FIG. 6A is a graph of the margin value of the sensor with respect to the sensing distance of a target.
FIG. 6B is a table of values taken from the graph of FIG. 6A.
Figure 6C:
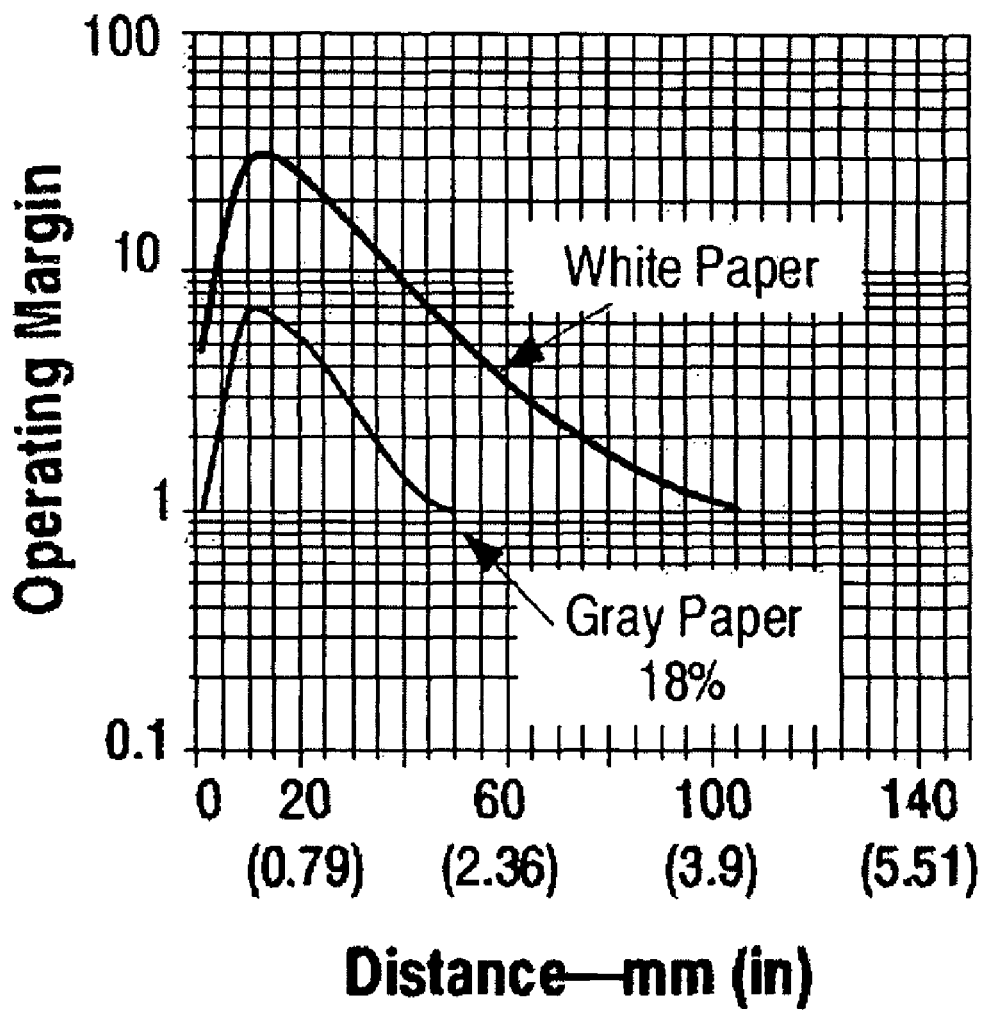
FIG. 6C is a graph of a margin value of a prior art sensor with respect to the sensing distance of a target.

The use of the refraction block 25 allows for an increased margin value at various sensing distances, as illustrated in FIGS. 6A and 6B. FIG. 6A depicts a graph of the margin achieved by the sensor 2 when the target distance is between 1 and 134 mm, for a white paper target having a reflectivity of 90%, and for a paper target having 18% reflectivity. FIG. 6B depicts a chart of values obtained from the graph in FIG. 6A. As can be seen from the FIGS. 6A and 6B, when the target is 90% reflective and the target distance is in the range of about 23 mm to about 33 mm from the receive lens 24, the excess gain is at least 500. Further, when the target 20 is 90% reflective and the target distance is in the range of about 1 mm to about 70 mm from the sensor 2, the excess gain is at least 25, indicating that the sensor 2 lacks a significant blind-spot. Lastly, as the target distance reaches about 130 mm, the margin value drops off to about zero. This indicates that the light 22 is no longer being received at the photodetector surface 26, thereby a sensing cut-off has been established. Further, as can be seen in FIGS. 6A and 6B, the refraction block 25 allows for extremely high margin values for the sensor 2. The increased margin values provide the sensor 2 the ability to sense very small targets, for example, a target having a diameter as small as 0.1 mm.

Notwithstanding the above examples, the present invention is intended to encompass numerous other embodiments and/or applications, and/or to satisfy a variety of other performance levels or criteria in addition to or instead of the above examples. It is specifically intended that the present invention not be limited to the embodiments and illustrations contained herein, but include modified forms of those embodiments including portions of the embodiments and combinations of elements of different embodiments as come within the scope of the following claims.

We claim:
1. A photoelectric sensor comprising:
an emitting portion for emitting light toward a target;
a receiving portion including a receive lens for receiving, through the receive lens, reflected light that is at least some of the emitted light reflected by one of the target and a reflector;
a refraction block having a block first surface and a block second surface, wherein the reflected light received through the receive lens is refracted by at least one of the surfaces as it passes through the refraction block; and
a photodetector for receiving the reflected light refracted by the refraction block, and providing a detection signal indicative of the reflected light received by the photodetector.

2. The photoelectric sensor of claim 1, wherein the emitting portion includes a light emitting diode (LED) light source.

3. The photoelectric sensor of claim 1, wherein the receive lens has a receive front surface and a receive back surface, and the photodetector has a detection surface, and the detection surface is substantially parallel to the receive front surface.

4. The photoelectric sensor of claim 2, wherein the block first surface is substantially parallel to a detection surface of the photodetector, and the block second surface is situated at an angle with respect to the block first surface.

5. The photoelectric sensor of claim 2, wherein the block second surface is situated at an angle between about 5 degrees and about 85 degrees with respect to the block first surface.

6. The photoelectric sensor of claim 1, wherein the reflected light is refracted by both the block first surface and the block second surface.

7. The photoelectric sensor of claim 1, wherein the emitting portion and the receiving portion are situated in a single housing.

8. The photoelectric sensor of claim 1, wherein the emitting portion includes an emit lens that refracts the light emitted from the light source prior to receipt by the target.

9. The photoelectric sensor of claim 1, wherein the photodetector is mounted to a printed circuit board.

10. The photoelectric sensor of claim 9, wherein an electromagnetic interference (EMI) shield is situated in front of the printed circuit board to at least partially prevent EMI from reaching the photodetector.

11. The photoelectric sensor of claim 1, further including a housing having a housing aperture situated between the refraction block and the photodetector, the housing aperture being capable of at least one of limiting and preventing at least a portion of the reflected light from being transmitted to the photodetector.

12. The photoelectric sensor of claim 11, wherein the sensor is capable of sensing reflected light from a target having a diameter as small as 0.1 millimeters.

13. The photoelectric sensor of claim 12, wherein when the target is 90% reflective and is situated at a distance in the range of about 23 mm to about 33 mm from the receive lens, the margin value is at least 500.

14. The photoelectric sensor of claim 13 wherein the photoelectric sensor is a diffuse reflective type that is capable of sensing a target at a distance in the range of about 1 mm to about 130 mm.

15. The photoelectric sensor of claim 1, wherein the refraction block is comprised of at least one of an optical acrylic material, a polystyrene, and a polycarbonate material.

16. A diffuse type photoelectric sensor comprising:
an emitting portion for emitting light toward a target, the emitting portion including a light emitting diode (LED) light source and an emit lens;

a receiving portion including a receive lens for receiving, through the receive lens, reflected light that is at least some of the emitted light that is reflected by the target;

a refraction block situated in the receiving portion having a block first surface and a block second surface, wherein the reflected light received through the receive lens is refracted by at least one of the block first and second surfaces as it passes through the refraction block;

a housing for at least partially enclosing the emitting portion, the receiving portion and the refraction block;

a photodetector for receiving the reflected light refracted by the refraction block, and providing a detection signal indicative of the reflected light received;

a housing aperture formed as part of the housing and situated between the refraction block and the photodetector; and an electromagnetic interference (EMI) shield situated substantially between the photodetector and the housing.

17. The photoelectric sensor of claim 16, wherein the photodetector has a detection surface, the block first surface is substantially parallel to the detection surface and the block second surface is situated at an angle with respect to the block first surface.

18. The photoelectric sensor of claim 16, wherein the reflected light is refracted by both the block first surface and the block second surface prior to being received by the photodetector.

19. A method for sensing a target comprising:
emitting light towards a target from a light source situated in an emitting portion;
receiving through a receive lens reflected light that is at least some of the emitted light that is reflected by the target;
receiving the reflected light from the receive lens at a refraction block that includes a block first surface and a block second surface;
refracting the reflected light using at least one of the block first surface and the block second surface;
receiving the reflected light from the block second surface at a photodetector surface; and
generating a signal indicative of the reflected light received at the photodetector surface.

20. The method for sensing a target of claim 19, further including sensing a target having a diameter as small as about 0.1 millimeters.

* * * * *